US012737873B2

(12) United States Patent
Onoto

(10) Patent No.: US 12,737,873 B2
(45) Date of Patent: Sep. 15, 2026

(54) INSPECTION APPARATUS AND STORAGE MEDIUM STORING COMPUTER PROGRAM

(71) Applicant: BROTHER KOGYO KABUSHIKI KAISHA, Nagoya (JP)

(72) Inventor: Shoji Onoto, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 356 days.

(21) Appl. No.: 18/504,328

(22) Filed: Nov. 8, 2023

(65) Prior Publication Data

US 2024/0078658 A1 Mar. 7, 2024

Related U.S. Application Data

(63) Continuation of application No. PCT/JP2022/019288, filed on Apr. 28, 2022.

(30) Foreign Application Priority Data

May 20, 2021 (JP) ................................ 2021-085710
Jan. 26, 2022 (JP) ................................ 2022-009941

(51) Int. Cl.
*G06T 7/00* (2017.01)
*G06T 5/80* (2024.01)
(Continued)

(52) U.S. Cl.
CPC .............. *G06T 7/0006* (2013.01); *G06T 5/80* (2024.01); *G06T 7/62* (2017.01); *G06T 7/70* (2017.01);
(Continued)

(58) Field of Classification Search
CPC ........... G06T 7/0006; G06T 5/80; G06T 7/62; G06T 7/70; G06T 2207/30108;
(Continued)

(56) References Cited

U.S. PATENT DOCUMENTS

2002/0158199 A1 10/2002 Takane et al.
2005/0225551 A1* 10/2005 Shimizu .................. G06T 19/00 345/419
(Continued)

FOREIGN PATENT DOCUMENTS

GB 2297379 A 7/1996
JP H08204096 A 8/1996
(Continued)

OTHER PUBLICATIONS

Cognex, “In-Sight Track & Trace User Manual”, 2017, Cognex (Year: 2017).*
(Continued)

*Primary Examiner* — Oneal R Mistry
*Assistant Examiner* — Justin Philip Cascais
(74) *Attorney, Agent, or Firm* — Scully, Scott, Murphy & Presser, P. C.

(57) ABSTRACT

An inspection apparatus acquires drawing data indicating a drawing of a portion including a label affixed to a particular affix position of a product, identifies the label in the drawing, identifies a position of a reference portion of the product in the drawing, acquires dimension information indicated in the drawing based on the drawing data and identification results of the label and the reference portion in the drawing, acquires captured image data obtained by capturing an image of the product, identifies the label in the captured image, identifies the reference portion of the product in the captured image, and determines whether an affix position of the label in the captured image is the particular affix position specified by the dimension information, based on identification results of the label and a position of the reference portion in the captured image and the dimension information.

19 Claims, 8 Drawing Sheets

(51) Int. Cl.

| | |
|---|---|
| ***G06T 7/62*** | (2017.01) |
| ***G06T 7/70*** | (2017.01) |
| ***G06V 30/19*** | (2022.01) |
| ***G06V 30/422*** | (2022.01) |

(52) U.S. Cl.
CPC ............ *G06V 30/19* (2022.01); *G06V 30/422* (2022.01); *G06T 2207/30108* (2013.01)

(58) Field of Classification Search
CPC . G06T 2207/30204; G06T 7/00; G06V 30/19; G06V 30/422; G06V 10/225; G06V 10/44; G06V 10/74; G01B 11/02
See application file for complete search history.

(56) References Cited

U.S. PATENT DOCUMENTS

| | | | | |
|---|---|---|---|---|
| 2014/0195382 | A1 | 7/2014 | Ishiyama | |
| 2018/0202946 | A1 | 7/2018 | Mishima | |
| 2019/0156472 | A1 * | 5/2019 | Link | G06T 7/001 |
| 2019/0378259 | A1 | 12/2019 | Hayashi et al. | |

FOREIGN PATENT DOCUMENTS

| | | | |
|---|---|---|---|
| JP | H09-128429 | A1 | 5/1997 |
| JP | H10-47935 | A | 2/1998 |
| JP | 2000339459 | A | 12/2000 |
| JP | 2001-41725 | A | 2/2001 |
| JP | 2002-207998 | A | 7/2002 |
| JP | 2002328015 | A | 11/2002 |
| JP | 2012037257 | A | 2/2012 |
| JP | 2014083529 | A | 5/2014 |
| JP | 2017073005 | A | 4/2017 |
| JP | 2017-223473 | A | 12/2017 |
| JP | 2018116022 | A | 7/2018 |
| JP | 2019-46361 | A | 3/2019 |
| JP | 2020-106936 | A | 7/2020 |
| WO | 2013018615 | A1 | 2/2013 |
| WO | 2018/163572 | A1 | 9/2018 |

OTHER PUBLICATIONS

International Preliminary Report on Patentability and Written Opinion dated Nov. 21, 2023 issued in PCT/JP2022/019288 together with English language translation.
International Search Report dated Jul. 26, 2022 issued in PCT/JP2022/019288.

* cited by examiner 300
30
32
S2b
d2a
S2a
AR2
L2
d2b
Y
X
Z
S1a
S1b
AR1
d1a
d1b
L1
31

INSPECTION APPARATUS AND STORAGE MEDIUM STORING COMPUTER PROGRAM

REFERENCE TO RELATED APPLICATIONS

This is a Continuation application of International Application No. PCT/JP2022/019288 filed on Apr. 28, 2022, which claims priority from Japanese Patent Application No. 2021-085710 filed on May 20, 2021 and No. 2022-009941 filed on Jan. 26, 2022. The entire content of each of the prior applications is incorporated herein by reference.

BACKGROUND ART

A technique for inspecting a target object by using captured image data obtained by capturing the target object to be inspected is known.

DESCRIPTION

For example, an application state inspection apparatus inspects an application state of a sealing material applied to a work, by using image data obtained by capturing the work with a capturing device. The application state inspection apparatus identifies an application area in the captured image, and identifies a center line of the application area as an application trajectory. The inspection apparatus determines a reference point and a reference direction of the application trajectory based on the center of gravity of the application area, and corrects a positional deviation between the application trajectory and a reference application trajectory by using the reference point and the reference direction. After correcting the positional deviation, the inspection apparatus compares the application trajectory with the reference application trajectory to determine whether the application state is normal.

However, the above technique aims at determining whether the shape of the application area itself is normal, and correction of the positional deviation is performed to correct the positional relationship deviation between the capturing device and the work. For this reason, even if the above technique is applied to inspect an affix position of a label affixed to a product, it cannot be said that the inspection of the affix position of the label can be easily performed. Such a problem is not limited to the case of inspecting the affix position of a label affixed to a product, but is generally a common problem in the case of inspecting the arrangement position of a constituent part that constitutes a part of an object.

This specification discloses a technique for inspecting an arrangement position of a constituent part that constitutes a part of an object, for example, a technique for inspecting an affix position of a label affixed to a product.

According to one aspect, this specification discloses an inspection apparatus. The inspection apparatus includes a controller and a memory storing instructions. When executed by the controller, the instructions cause the inspection apparatus to perform acquiring drawing data indicating a drawing of a portion including a label affixed to a particular affix position of a product. Thus, the inspection apparatus acquires drawing data. The instructions cause the inspection apparatus to perform identifying the label in the drawing based on the drawing data. Thus, the inspection apparatus identifies the label in the drawing. The instructions cause the inspection apparatus to perform identifying a position of a reference portion of the product in the drawing based on the drawing data, the reference portion being a portion serving as a reference for specifying the particular affix position of the label with respect to the product. Thus, the inspection apparatus identifies the position of the reference portion of the product in the drawing. The instructions cause the inspection apparatus to perform acquiring dimension information indicated in the drawing based on the drawing data, an identification result of the label in the drawing, and an identification result of the position of the reference portion in the drawing, the dimension information being information for specifying a positional relationship between the reference portion and the particular affix position, the dimension information including a tolerance of the particular affix position. Thus, the inspection apparatus acquires dimension information. The instructions cause the inspection apparatus to perform acquiring captured image data obtained by capturing an image of the product to which the label is affixed, a captured image indicated by the captured image data including a portion of the product including the label. Thus, the inspection apparatus acquires the captured image data. The instructions cause the inspection apparatus to perform identifying the label in the captured image based on the captured image data. Thus, the inspection apparatus identifies the label in the captured image. The instructions cause the inspection apparatus to perform identifying the reference portion of the product in the captured image based on the captured image data. Thus, the inspection apparatus identifies the reference portion of the product in the captured image. The instructions cause the inspection apparatus to perform determining whether an affix position of the label in the captured image is the particular affix position specified by the dimension information, based on an identification result of the label in the captured image, an identification result of a position of the reference portion in the captured image, and the dimension information. Thus, the inspection apparatus determines whether the affix position of the label in the captured image is the particular affix position.

According to the above configuration, the drawing data is used to identify the position of the reference portion of the product in the drawing and the label in the drawing, and the identification result is used to acquire the dimension information that defines the positional relationship between the reference portion and the particular affix position. Then, the captured image data is used to identify the label and the reference portion in the captured image, and the identification result and the dimension information are used to determine whether the affix position of the label is the particular affix position. As a result, by using the drawing data and the captured image data, the affix position of the label affixed to the product is easily inspected.

According to another aspect, this specification also discloses a non-transitory computer-readable storage medium storing a set of program instructions for an inspection apparatus. The inspection apparatus includes a controller and a memory. The set of program instructions, when executed by the controller, cause the inspection apparatus to perform: acquiring drawing data indicating a drawing of a portion including a label affixed to a particular affix position of a product; identifying the label in the drawing based on the drawing data; identifying a position of a reference portion of the product in the drawing based on the drawing data, the reference portion being a portion serving as a reference for specifying the particular affix position of the label with respect to the product; acquiring dimension information indicated in the drawing based on the drawing data, an identification result of the label in the drawing, and an identification result of the position of the reference portion in the drawing, the dimension information being information for specifying a positional relationship between the reference portion and the particular affix position, the dimension information including a tolerance of the particular affix position; acquiring captured image data obtained by capturing an image of the product to which the label is affixed, a captured image indicated by the captured image data including a portion of the product including the label; identifying the label in the captured image based on the captured image data; identifying the reference portion of the product in the captured image based on the captured image data; and determining whether an affix position of the label in the captured image is the particular affix position specified by the dimension information, based on an identification result of the label in the captured image, an identification result of a position of the reference portion in the captured image, and the dimension information.

According to still another aspect, this specification also discloses an inspection apparatus. The inspection apparatus includes a controller and a memory storing instructions. When executed by the controller, the instructions cause the inspection apparatus to perform acquiring drawing data indicating a drawing of a portion including a constituent part arranged at a particular arrangement position of an object. Thus, the inspection apparatus acquires the drawing data. The instructions cause the inspection apparatus to perform identifying the constituent part in the drawing based on the drawing data; identifying a position of a reference portion of the object in the drawing based on the drawing data, the reference portion being a portion serving as a reference for specifying the particular arrangement position of the constituent part with respect to the object. Thus, the inspection apparatus identifies the constituent part in the drawing. The instructions cause the inspection apparatus to perform acquiring dimension information indicated in the drawing based on the drawing data, an identification result of the constituent part in the drawing, and an identification result of the position of the reference portion in the drawing, the dimension information being information for specifying a positional relationship between the reference portion and the particular arrangement position, the dimension information including a tolerance of the particular arrangement position; acquiring captured image data obtained by capturing an image of the object on which the constituent part is formed, a captured image indicated by the captured image data including a portion of the object including the constituent part. Thus, the inspection apparatus acquires the dimension information. The instructions cause the inspection apparatus to perform identifying the constituent part in the captured image based on the captured image data. Thus, the inspection apparatus identifies the constituent part in the captured image. The instructions cause the inspection apparatus to perform identifying the reference portion of the object in the captured image based on the captured image data. Thus, the inspection apparatus identifies the reference portion of the object in the captured image. The instructions cause the inspection apparatus to perform determining whether an arrangement position of the constituent part in the captured image is the particular arrangement position specified by the dimension information, based on an identification result of the constituent part in the captured image, an identification result of a position of the reference portion in the captured image, and the dimension information. Thus, the inspection apparatus determines whether the arrangement position of the constituent part in the captured image is the particular arrangement position.

According to the above configuration, the drawing data is used to identify the position of the reference portion of the object in the drawing and the constituent part in the drawing, and the identification result is used to acquire the dimension information that defines the positional relationship between the reference portion and the particular arrangement position. Then, the captured image data is used to identify the constituent part and the reference portion in the captured image, and the identification result and the dimension information are used to determine whether the arrangement position of the constituent part is the particular arrangement position. As a result, by using the drawing data and the captured image data, the arrangement position of the constituent part constituting a part of the object is easily inspected.

The technology disclosed in this specification may be implemented in various forms, and, for example, it may be implemented in the form of an inspection apparatus, an inspection method, a computer program for realizing the apparatus and method, a storage medium storing the computer program, and so on.

A. FIRST EMBODIMENT

A-1. Configuration of Data Generation Apparatus

Figure 1:
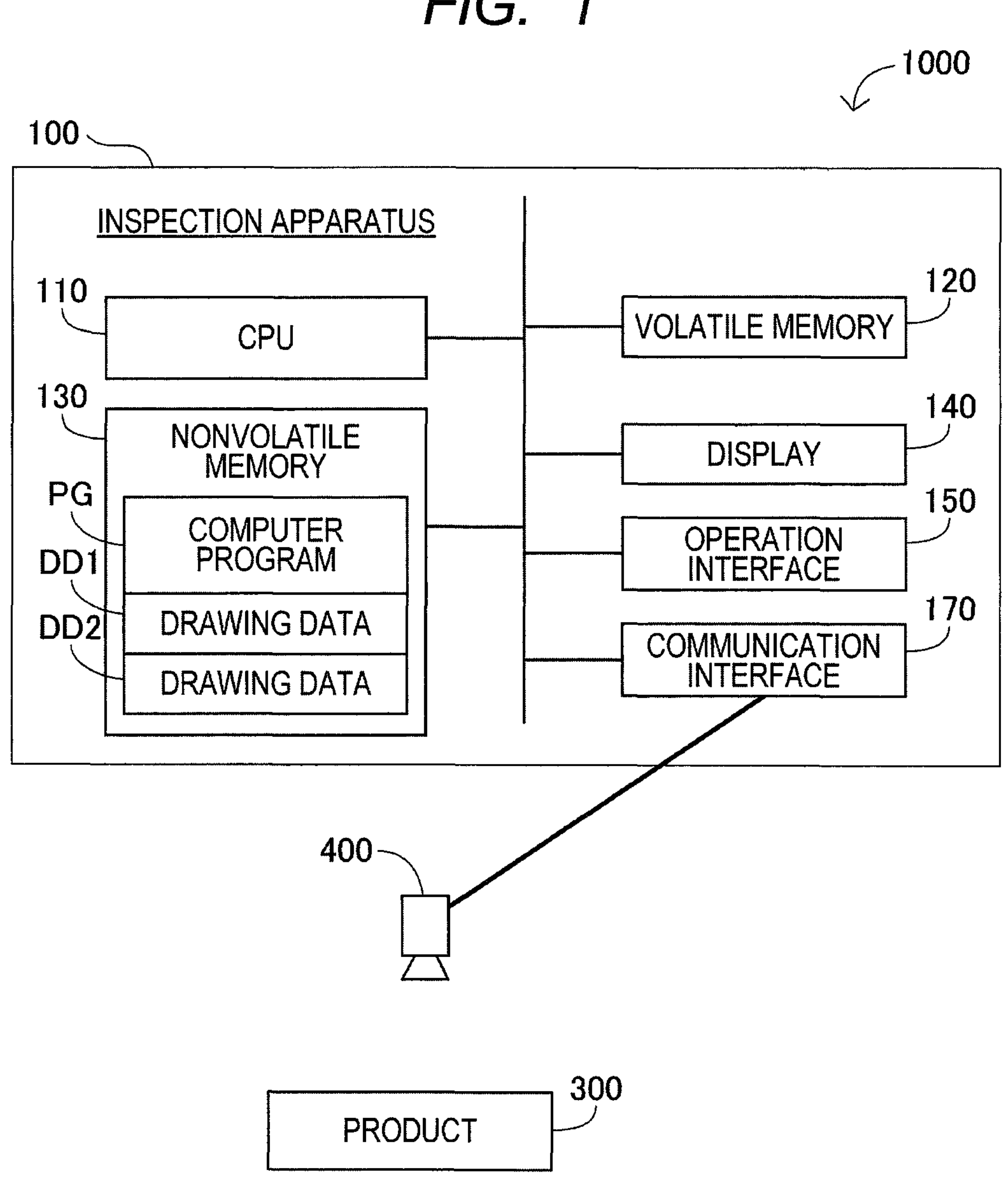
FIG. 1 is a block diagram showing a configuration of an inspection system.

Next, embodiments will be described based on examples. FIG. 1 is a block diagram showing the configuration of an inspection system 1000 of this embodiment. The inspection system 1000 includes an inspection apparatus 100 and a capturing device 400. The inspection apparatus 100 and the capturing device 400 are communicably connected to each other.

The inspection apparatus 100 is, for example, a computer such as a personal computer. The inspection apparatus 100 includes a CPU 110 as a controller of the inspection apparatus 100, a volatile memory 120 such as a RAM, a nonvolatile memory 130 such as a hard disk drive, an operation interface 150 such as a mouse and a keyboard, a display 140 such as a liquid crystal display, and a communication interface 170. The communication interface 170 includes a wired or wireless interface for communicably connecting to an external device such as the capturing device 400, for example.

The volatile memory 120 provides a buffer area for temporarily storing various intermediate data generated when the CPU 110 performs processing. The nonvolatile memory 130 stores a computer program PG for the inspection apparatus.

The computer program PG is provided, for example, by the manufacturer of inspection apparatus 100. The computer program PG may be provided, for example, in the form of being downloaded from a server, or may be provided in the form of being stored in a DVD-ROM and so on. The CPU 110 executes an inspection preparation process and an inspection process described later, by executing the computer program PG.

The capturing device 400 is a digital camera that generates image data indicating a subject (also referred to as captured image data) by optically capturing an image of the subject. The capturing device 400 generates captured image data and transmits the captured image data to the inspection apparatus 100 under the control of the inspection apparatus 100. In this embodiment, the capturing device 400 is used to capture an image of a product 300 that is an inspection target of the inspection process and to generate captured image data indicating a captured image including the appearance of the product 300.

Figure 2:
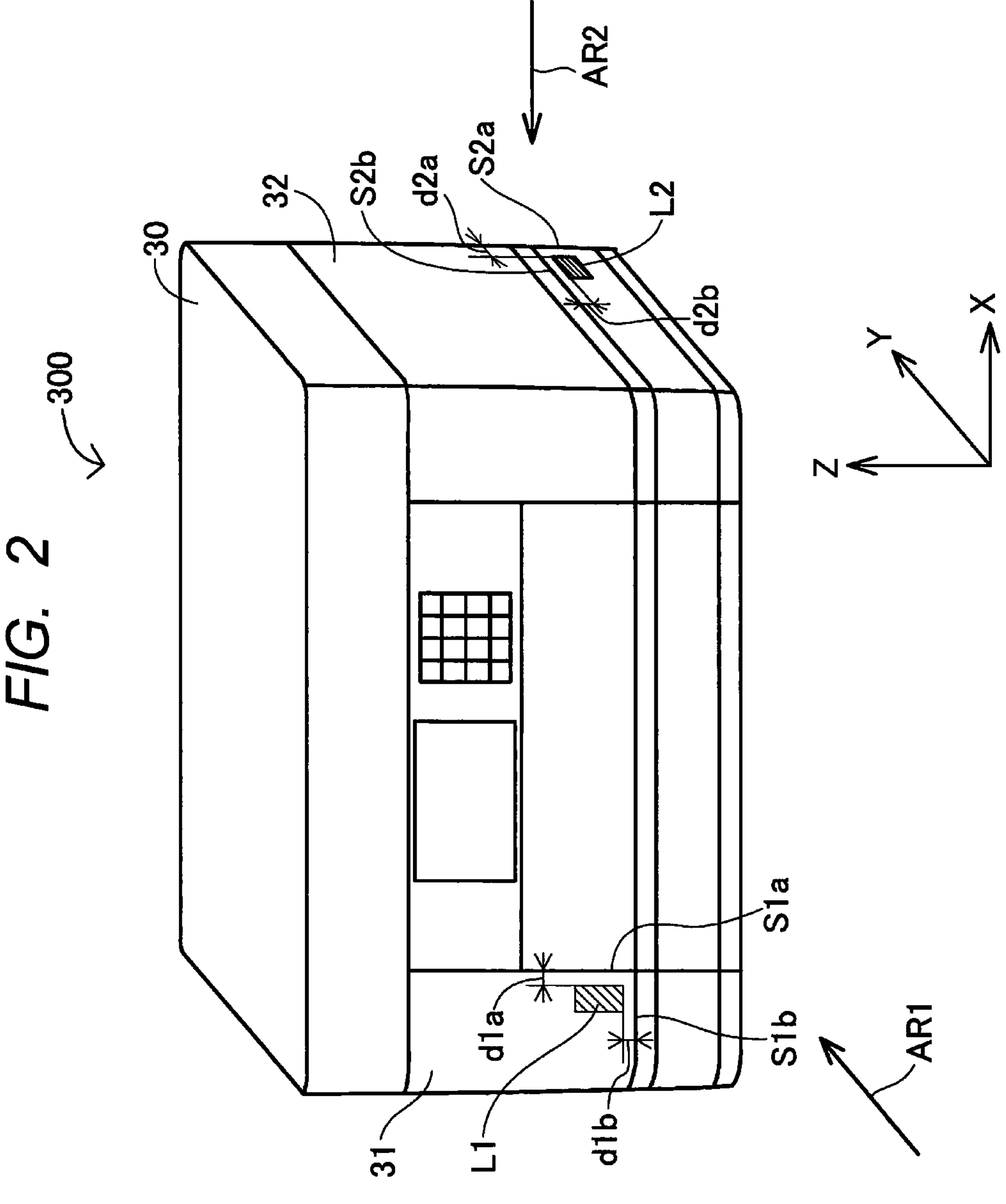
FIG. 2 is a perspective view of a work.

FIG. 2 is a perspective view of the product 300. The product 300 is a printer having a substantially rectangular parallelepiped housing 30 in this embodiment. In the manufacturing process, rectangular labels L1 and L2 are affixed to particular positions on a front surface 31 (the surface on the −Y side) and a right side surface 32 (the surface on the +X side) of the housing 30, respectively. For example, various information such as the brand logo of the manufacturer and the product, a model number, and a lot number are described on the labels L1 and L2.

The nonvolatile memory 130 further stores drawing data DD1 and DD2. The drawing data DD1 and DD2 are image data indicating drawings DI1 and DI2, respectively. In this embodiment, the drawing data is bitmap data indicating an image including a plurality of pixels, and more specifically, RGB image data indicating the color of each pixel using RGB values. The RGB values are tone values of three color components (hereinafter also referred to as component values), that is, color values in the RGB color system including R, G, and B values. The R, G, and B values are, for example, gradation values of a particular number of tones (for example, 256).

Figure 3A:
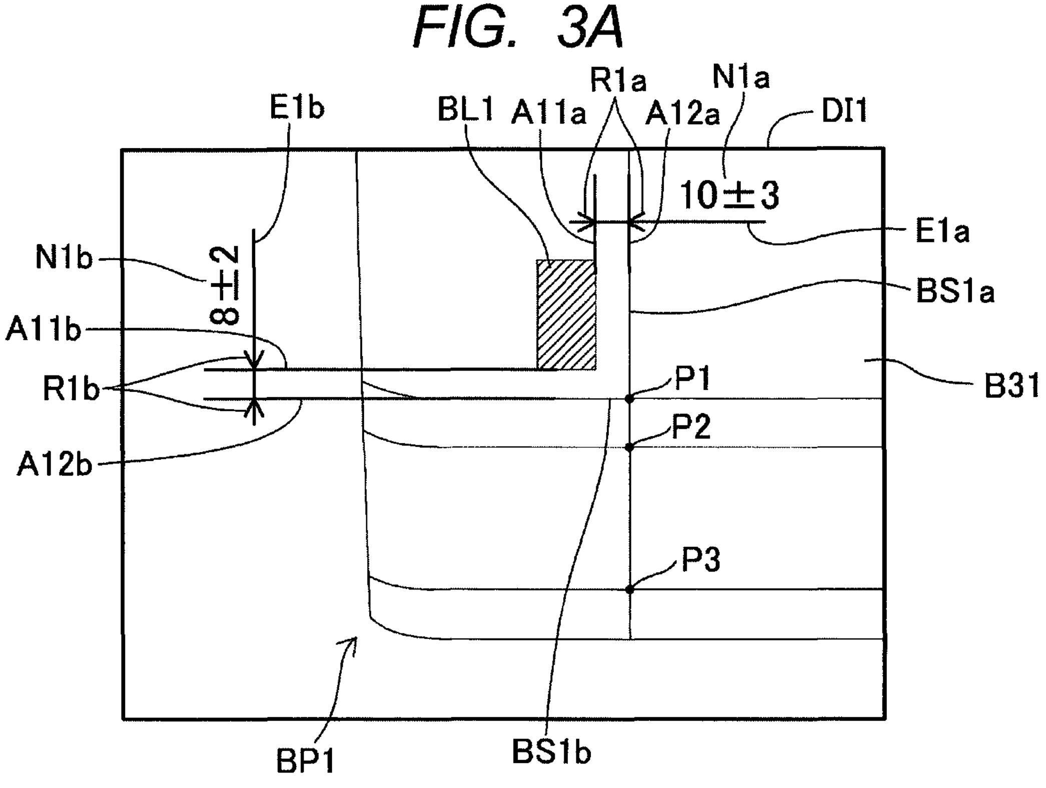
FIGS. 3A and 3B are diagrams showing examples of drawings.
Figure 3B:
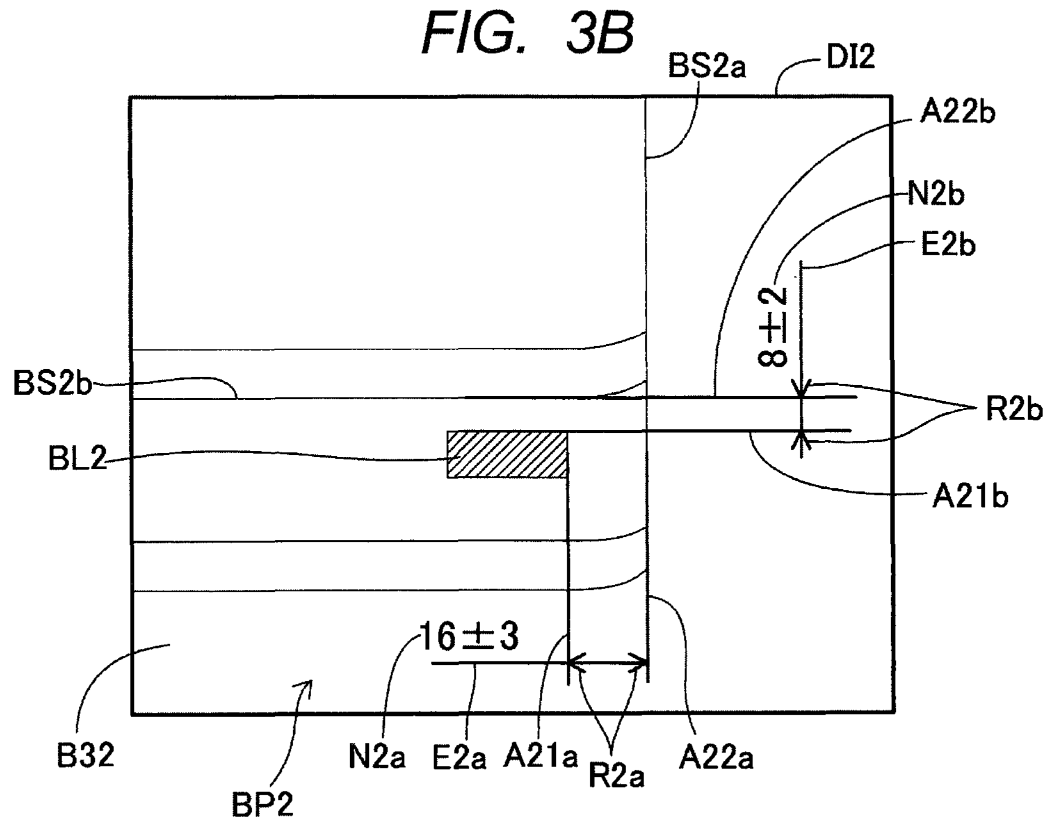

FIGS. 3A and 3B are diagrams showing examples of a drawing. The drawings DI1 and DI2 are drawings used for instructions for the process of affixing the labels L1 and L2. The drawing DI1 includes a diagram BP1 of a portion including the label L1, in the front surface 31 of the housing 30. Hereinafter, the label illustrated in the diagram BP1 is also referred to as a label BL1 by adding "B" to the reference sign of the actual label L1. The front surface of the housing illustrated in the diagram BP1 is also referred to as a front surface B31 by adding "B" to the reference sign of the actual front surface 31.

The diagram BP1 further includes extension lines A11*a*, A12*a*, A11*b*, and A12*b* for defining the position of the label L1 with respect to the housing 30, dimension lines E1*a* and E1*b*, numerical values N1*a* and N1*b*, and arrows R1*a* and R1*b*.

The extension line A11*a* is a straight line in contact with the right edge of the label BL1 and indicates the horizontal position of the right edge of the label BL1. The extension line A12*a* is a straight line drawn on a reference portion BS1*a* of the front surface B31 and indicates the horizontal position of the reference portion BS1*a*. The reference portion BS1*a* of the diagram BP1 corresponds to the reference portion S1*a* of the housing 30 (FIG. 2). The reference portion is a portion used as a reference for defining the label affix position. The reference portion is a characteristic portion that appears in the appearance of the housing 30. For example, the reference portion is a boundary between a plurality of parts that constitute the housing 30 or a line constituting the design of the housing 30 or the outline of the housing 30. The two extension lines A11*a* and A12*a* extend vertically and are parallel to each other. The dimension line Ela is a straight line associated with the two extension lines A11*a* and A12*a*. Specifically, the dimension line Ela perpendicularly intersects the two extension lines A11*a* and A12*a*. A pair of arrows R1*a* is added to the intersection of the dimension line Ela and the two extension lines A11*a* and A12*a*. The pair of arrows R1*a* is a kind of terminal symbol. The numerical value N1*a* is a numerical value associated with the dimension line Ela and is located near the dimension line Ela.

The extension line A11*b* is a straight line in contact with the lower edge of the label BL1 and indicates the vertical position of the lower edge of the label BL1. The extension line A12*b* is a straight line drawn on a reference portion BS1*b* of the front surface B31 and indicates the vertical position of the reference portion BS1*b*. The reference portion BS1*b* of the front surface B31 corresponds to the reference portion S1*b* of the housing 30 (FIG. 2). The reference portion S1*b* is a characteristic portion that appears in the appearance of the housing 30, like the reference portion S1*a*. The two extension lines A11*b* and A12*b* extend horizontally and are parallel to each other. The dimension line E1*b* is a straight line associated with the two extension lines A11*b* and A12*b*. Specifically, the dimension line E1*b* perpendicularly intersects the two extension lines A11*b* and A12*b*. A pair of arrows R1*b* is added to the intersections of the dimension line E1*b* and the two extension lines A11*b* and A12*b*. The numerical value N1*b* is a numerical value associated with the dimension line E1*b*, and is located near the dimension line E1*b*.

The drawing DI2 includes a diagram BP2 of a portion including the label L2, in the right side surface 32 of the housing 30. Hereinafter, the label illustrated in the diagram BP2 is also referred to as a label BL2 by adding "B" to the reference sign of the actual label L2. The right side surface of the housing 30 illustrated in the diagram BP2 is also referred to as a right side surface B32 by adding "B" to the reference sign of the actual right side surface 32.

The diagram BP2 further includes extension lines A21*a*, A22*a*, A21*b*, and A22*b* for defining the position of the label L2 with respect to the housing 30, dimension lines E2*a* and E2*b*, numerical values N2*a* and N2*b*, and arrows R2*a* and R2*b*.

The extension line A21*a* is a straight line in contact with the right edge of the label BL2, and indicates the horizontal position of the right edge of the label BL2. The extension line A22*a* is a straight line drawn on a reference portion BS2*a* of the right side surface B32, and indicates the horizontal position of the reference portion BS2*a*. The reference portion BS2*a* of the drawing DI2 corresponds to the reference portion S2*a* of the housing 30 (FIG. 2). The reference portion S2*a* is a characteristic portion that appears in the appearance of the housing 30, and is, for example, a line forming the outline of the housing 30. The two extension lines A21*a* and A22*a* extend vertically and are parallel to each other. The dimension line E2*a* is a straight line associated with the two extension lines A21*a* and A22*a*. Specifically, the dimension line E2*a* perpendicularly intersects the two extension lines A21*a* and A22*a*. A pair of arrows R2*a* is added to the intersections of the dimension line E2*a* and the two extension lines A21*a* and A22*a*. The numerical value N2*a* is a numerical value associated with the dimension line E2*a* and is located near the dimension line E2*a*.

The extension line A21*b* is a straight line in contact with the upper edge of the label BL2 and indicates the vertical position of the upper edge of the label BL2. The extension line A22*b* is a straight line drawn on a reference portion BS2*b* of the right side surface B32, and indicates the vertical position of the reference portion BS2*b*. The reference portion BS2*b* of the drawing DI2 corresponds to the reference portion S2*b* of the housing 30 (FIG. 2). The two extension lines A21*b* and A22*b* extend horizontally and are parallel to each other. The dimension line E2*b* is a straight line associated with the two extension lines A21*b* and A22*b*. Specifically, the dimension line E2*b* perpendicularly intersects the two extension lines A21*b* and A22*b*. A pair of arrows R2*b* is added to the intersections of the dimension line E2*b* and the two extension lines A21*b* and A22*b*. The numerical value N2*b* is a numerical value associated with the dimension line E2*b* and is located near the dimension line E2*b*.

A-2. Inspection Preparation Process

Figure 4:
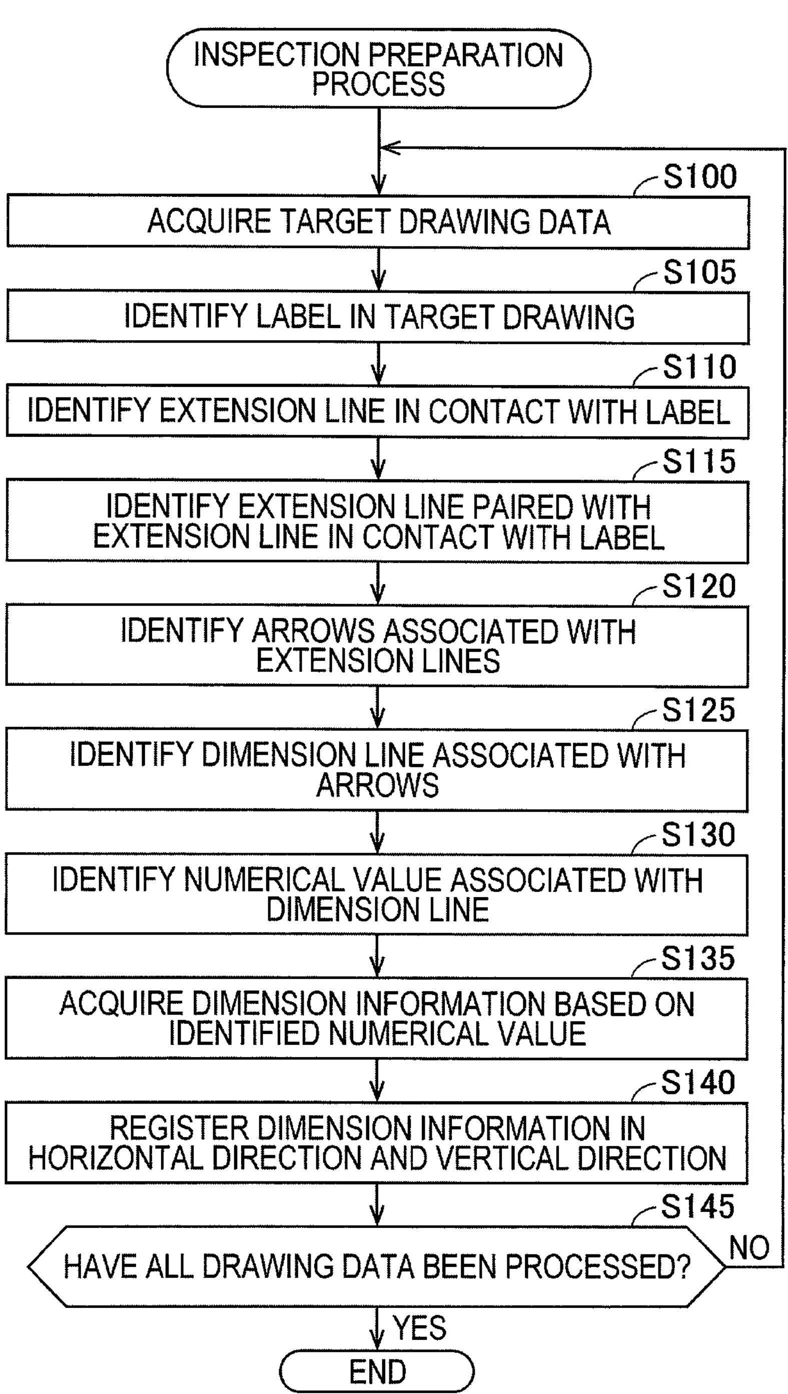
FIG. 4 is a flowchart of an inspection preparation process.

The inspection preparation process is a process of acquiring dimension information used in the inspection process described later, by using the drawing data DD1 and DD2. The inspection preparation process is executed prior to the inspection process. FIG. 4 is a flowchart of the inspection preparation process.

In S100, the CPU 110 selects one target drawing data from the drawing data DD1 and DD2 stored in the nonvolatile memory 130. In the following, a case where the drawing data DD1 indicating the drawing DI1 in FIG. 3A is the target drawing data will be described as a main example.

In S105, the CPU 110 identifies a label in the drawing indicated by the target drawing data (also referred to as target drawing). For example, in a case where the target drawing is the drawing DI1 in FIG. 3A, the label BL1 in the drawing DI1 is identified. For example, the CPU 110 displays the drawing DI1 on the display 140. The operator specifies the position of the label BL1 on the displayed drawing DI1 by using a pointing device. The CPU 110 analyzes the vicinity of the specified position in the drawing DI1 to identify a rectangle containing the specified position. A known closed figure search process is used as the identification method. Alternatively, a technique such as pattern matching or image recognition processing using a machine learning model may be used.

In S110, the CPU 110 identifies extension lines that are in contact with the label identified in the target drawing. For example, in a case where the target drawing is the drawing DI1 in FIG. 3A, the extension lines A11*a* and A11*b* in contact with the label L1 are identified. For example, the CPU 110 identifies the extension line A11*a* extending vertically by searching for a straight line extending vertically near the left and right ends of the identified label L1. Further, the CPU 110 identifies the extension line A11*b* extending horizontally by searching for a straight line extending horizontally near the upper and lower ends of the identified label L1.

In S115, the CPU 110 identifies an extension line paired with the extension line in contact with the label of the target drawing. For example, in a case where the target drawing is the drawing DI1 in FIG. 3A, an extension line to be paired with is identified for each of the two extension lines A11*a* and A11*b* in contact with the label L1. Specifically, the CPU 110 uses the identified position of the extension line A11*a* as a starting point and searches for a straight line parallel to the extension line A11*a* in a direction away from the label BL1 (to the right in FIG. 3A). Thereby, the extension line A12*a* to be paired with the extension line A11*a* is identified. Identifying the extension line A12*a* is equivalent to identifying the horizontal position of the corresponding reference portion BS1*a*. Further, the CPU 110 uses the identified position of the extension line A11*b* as a starting point and searches for a straight line parallel to the extension line A11*b* in a direction away from the label BL1 (downward in FIG. 3A). Thereby, the extension line A12*b* to be paired with the extension line A11*b* is identified. Identifying the extension line A12*b* is equivalent to identifying the vertical position of the corresponding reference portion BS1*b*.

In S120, the CPU 110 identifies arrows associated with the extension lines that has already been identified in the target drawing. In a case where the target drawing is the drawing DI1 in FIG. 3A, the arrows associated with each of the extension lines A11*a*, A12*a*, A11*b*, and A12*b* are identified. Specifically, the CPU 110 identifies the pair of arrows R1*a* by searching for arrows along each of the extension lines A11*a* and A12*a*. Further, the CPU 110 identifies the pair of arrows R1*b* by searching for arrows along each of the extension lines A11*b* and A12*b*.

In S125, the CPU 110 identifies dimension lines associated with the identified arrows in the target drawing. In a case where the target drawing is drawing DI1 in FIG. 3A, the dimension lines E1*a* and E1*b* associated with the arrows R1*a* and R1*b* are identified. Specifically, the CPU 110 identifies the dimension line Ela by searching for a straight line connecting the pair of arrows R1*a*. Further, the CPU 110 identifies the dimension line E1*b* by searching for a straight line connecting the pair of arrows R1*b*.

In S130, the CPU 110 identifies numerical values associated with the identified dimension lines in the target drawing. In a case where the target drawing is the drawing DI1 in FIG. 3A, the CPU 110 identifies the numerical value N1*a* by searching for a numerical value along the dimension line Ela. Further, the CPU 110 identifies the numerical value N1*b* by searching for a numerical value along the dimension line E1*b*.

In S135, the CPU 110 acquires dimension information in the horizontal direction and the vertical direction based on the identified numerical values. The dimension information in the horizontal direction indicates the design value and tolerance of the dimension in the horizontal direction between either the left or right edge of the label and the reference portion located on either the left or right side of the label. The dimension information in the vertical direction indicates the design value and tolerance of the dimension in the vertical direction between one of the vertical edges of the label and the reference portion located above or below the label.

Specifically, in a case where the target drawing is the drawing DI1 in FIG. 3A, the CPU 110 recognizes the contents of the numerical values N1*a* and N1*b* by executing, in the areas of the numerical values N1*a* and N1*b*, a character recognition process used in a known OCR (Optical Character Recognition) technique. The numerical values N1*a* and N1*b* are described, for example, according to a particular format of "design value±tolerance (unit: mm (millimeters))". Based on the numerical value N1*a*, the CPU 110 acquires dimension information of a dimension d1*a* (FIG. 2) in the horizontal direction (X direction in FIG. 2) between the right edge of the label L1 and the reference portion S1*a*. Based on the numerical value N1*b*, the CPU 110 acquires dimension information of a dimension d1*b* (FIG. 2) in the vertical direction (Z direction in FIG. 2) between the lower edge of the label L1 and the reference portion S1*b*.

In S140, the CPU 110 registers (stores) the acquired dimension information in the horizontal direction and the vertical direction. For example, in a case where the target drawing is the drawing DI1 in FIG. 3A, the dimension information in the horizontal direction and the vertical direction are stored in the nonvolatile memory 130 in association with the drawing data DD1.

In S145, the CPU 110 determines whether all drawing data have been processed. In response to determining that all the drawing data have been processed (S145: YES), the CPU 110 ends the inspection preparation process. In response to determining that there is unprocessed drawing data (S145: NO), the CPU 110 returns to S100.

By the above inspection preparation process, as described above, the dimension information in the horizontal direction and the vertical direction for the label L1 is registered with the drawing data DD1 as the processing target. A similar process is performed on the drawing data DD2, and the dimension information in the horizontal direction and the vertical direction for the label L2 is registered. The dimension information in the horizontal direction for the label L2 indicates the design value and tolerance of a dimension d2*a* (FIG. 2) in the horizontal direction (Y direction in FIG. 2) between the right edge of the label L2 and the reference portion S2*a*. The dimension information in the vertical direction for the label L2 indicates the design value and tolerance of a dimension d2*b* (FIG. 2) in the vertical direction (Z direction in FIG. 2) between the upper edge of the label L2 and the reference portion S2*b*.

A-3. Inspection Process

The inspection process is a process of inspecting whether the labels L1 and L2 affixed to the product 300 are affixed to particular affix positions. The particular affix positions of the labels are the positions indicated by the instructions for the affixing process of the labels L1 and L2, that is, the positions shown in the above drawings DI1 and DI2.

Figure 5:
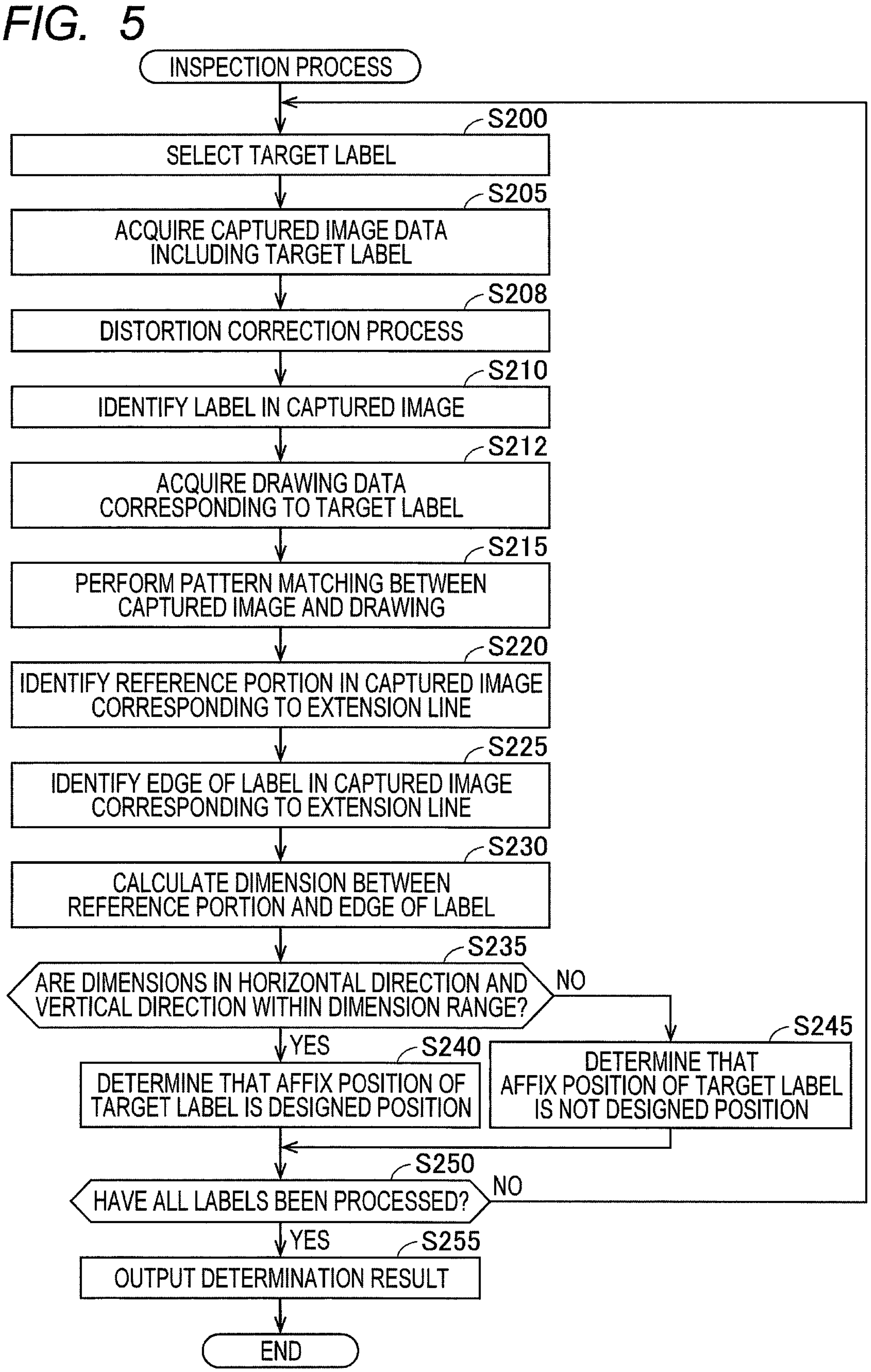
FIG. 5 is a flowchart of an inspection process.

FIG. 5 is a flowchart of the inspection process. The inspection process is executed for each product, and is started, for example, in a state where a product is placed at a particular position at which the product is captured using the capturing device 400. In S200, the CPU 110 selects one target label from the labels L1 and L2 (FIG. 2) to be inspected. A case where the label L1 is the target label will be described below as an example.

In S205, the CPU 110 acquires captured image data indicating a captured image including the target label. For example, in the example of FIG. 2, two labels L1 and L2 arranged on different surfaces of the housing 30 are the target of inspection. Thus, the capturing device 400 includes a first capturing device (not shown) that captures an image of a portion including the label L1 on the front surface 31 of the housing 30 in a capturing direction AR1 of FIG. 2, and a second capturing device (not shown) that captures an image of a portion including the label L2 of the right side surface 32 of the housing 30 in a capturing direction AR2. The capturing direction AR1 is the +Y direction, and the capturing direction AR2 is the −X direction. In a case where the target label is the label L1, the CPU 110 transmits a capturing instruction to the first capturing device and acquires captured image data from the first capturing device. Like the drawing data, the captured image data is bitmap data indicating an image including a plurality of pixels, and specifically is RGB image data indicating the color of each pixel using RGB values.

In S208, the CPU 110 performs a distortion correction process on the acquired captured image data. The distortion correction process includes, for example, a trapezoidal distortion correction process and a lens distortion correction process. The trapezoidal distortion correction process is processing for correcting distortion of a subject in a captured image due to a capturing (shooting) angle. The trapezoidal distortion correction processing may be performed using a known algorithm, for example, a projective transformation function of openCV. The lens distortion correction process is processing for correcting distortion that occurs in the subject of the captured image due to the lens of the capturing device. The lens distortion correction process may be performed using a known algorithm, for example, a distortion correction function of openCV.

Figure 6A:
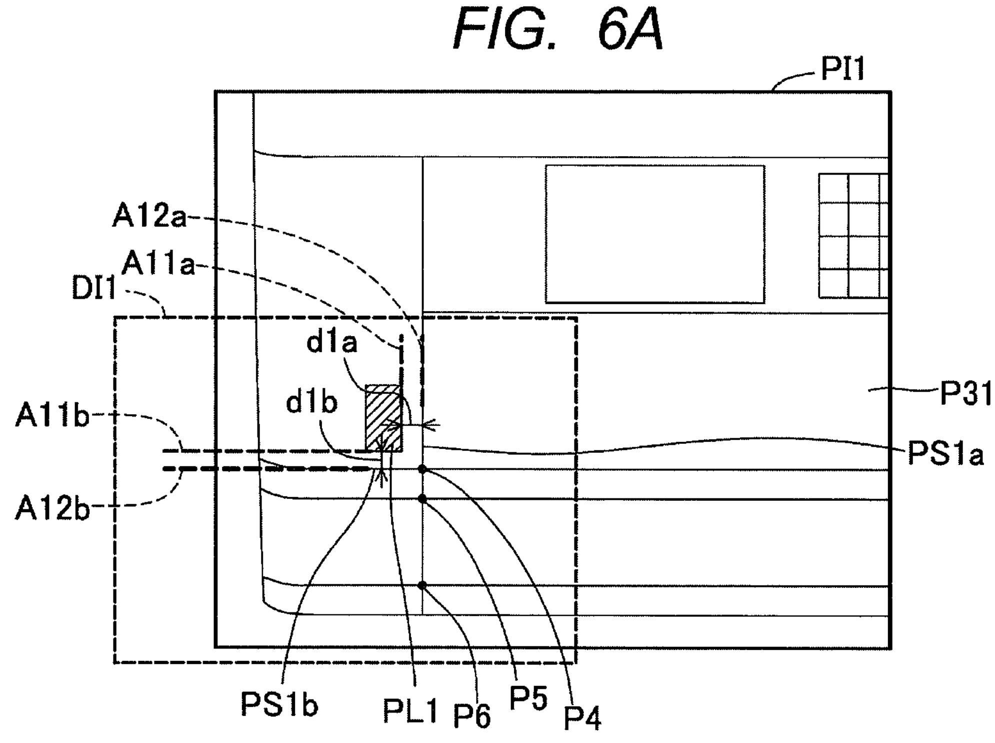
FIGS. 6A and 6B are diagrams showing examples of captured images indicated by captured image data.
Figure 6B:
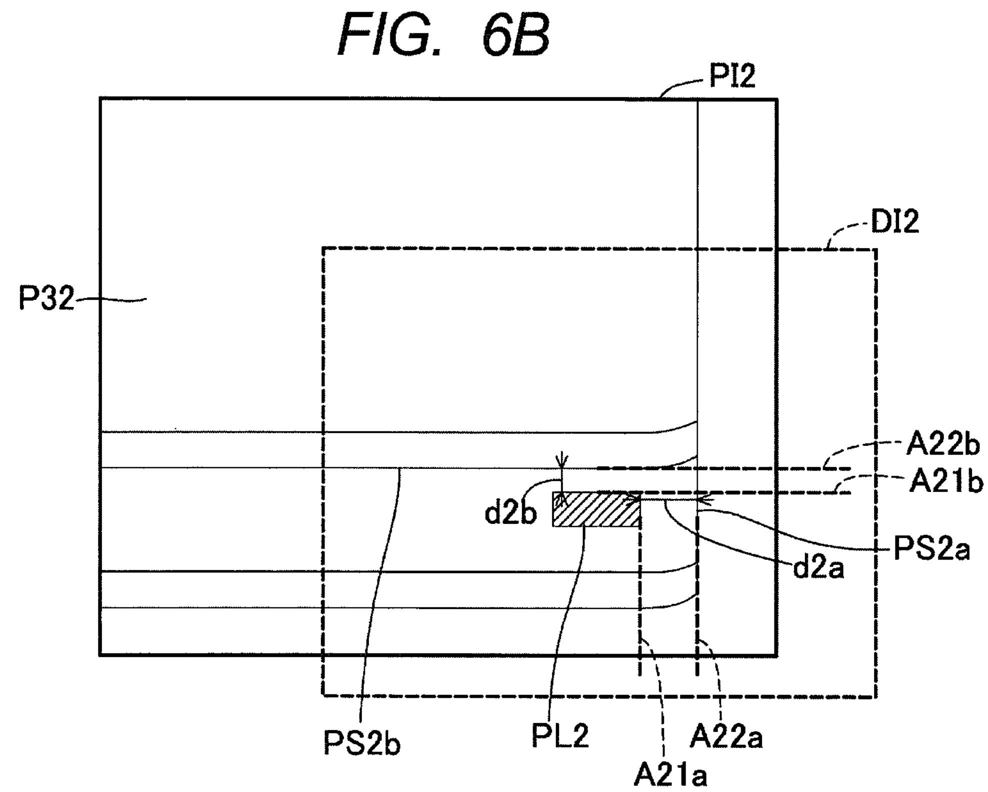

FIGS. 6A and 6B are diagrams showing examples of a captured image indicated by captured image data. A captured image PI1 in FIG. 6A shows a portion including the label L1 of the front surface 31 of the housing 30 of the product 300. The captured image PI1 includes an image showing the front surface 31 and an image showing the label L1. Hereinafter, the label shown in the captured image PI1 is referred to as a label PL1 by adding "P" to the reference sign of the actual label L1. The front surface of the housing shown in the captured image PI1 is also referred to as a front surface P31 by adding "P" to the reference sign of the actual front surface 31. Similarly, the reference portions of the housing shown in the captured image PI1 are also referred to as reference portions PS1*a* and PS1*b* by adding "P" to the reference signs of the actual reference portions S1*a* and S1*b* (FIG. 2).

A captured image PI2 in FIG. 6B shows a portion including the label L2 of the right side surface 32 of the housing 30 of the product 300. The captured image PI2 includes an image showing the right side surface 32 and an image showing the label L2. Hereinafter, the label shown in the captured image PI2 is referred to as a label PL2 by adding "P" to the reference sign of the actual label L2. The right side surface of the housing shown in the captured image PI2 is also referred to as a right side surface P32 by adding "P" to the reference sign of the actual right side surface 32. Similarly, the reference portions of the housing shown in the captured image PI2 are also referred to as reference portions PS2*a* and PS2*b* by adding "P" to the reference signs of the actual reference portions S2*a* and S2*b*.

In S210, the CPU 110 identifies the label PL1 in the captured image PI1. Identification of the label is performed, for example, by using an object detection or semantic segmentation technique using a machine learning model. As the machine learning model, for example, YOLO (You only Look Once), SSD (Single Shot Detector), U-net, and SegNet are used. Alternatively, identification of the label may be performed by using other techniques such as pattern matching.

In S212, the CPU 110 acquires drawing data corresponding to the target label from the nonvolatile memory 130. For example, in a case where the target label is the label L1 (FIG. 2), the CPU 110 acquires the drawing data DD1 indicating the drawing DI1 (FIG. 3A) used as the instructions for the process of affixing the label L1. In a case where the target label is the label L2, the CPU 110 acquires the drawing data DD2 indicating the drawing DI2 (FIG. 3B).

In S215, the CPU 110 performs pattern matching between the captured image and the drawing. For example, the CPU 110 performs pattern matching in the captured image PI1 of FIG. 6A by using the drawing DI1 of FIG. 3A as a template. Thereby, the positional relationship between the captured image PI1 and the drawing DI1 is identified. In the pattern matching of this step, for example, feature points P1, P2, and P3 of the drawing DI1 (FIG. 3A) and corresponding feature points P4, P5, and P6 of the captured image PI1 (FIG. 6A) are extracted by a known feature point extraction algorithm. Then, an enlargement/reduction process, a rotation process, and a translation process of the drawing DI1 are performed in the coordinate system of the captured image PI1, and the positional relationship in which the feature points P1, P2, and P3 of the drawing DI1 and the corresponding feature points P4, P5, and P6 of the captured image PI1 match is identified.

For example, in FIG. 6A, the drawing DI1 indicated by a rectangle of broken lines is arranged with respect to the captured image PI1 in the positional relationship identified by the pattern matching. In FIG. 6B, the drawing DI2 indicated by a rectangle of broken lines is arranged with respect to the captured image PI2 in the positional relationship identified by the pattern matching.

In S220, the CPU 110 identifies a reference portion in the captured image corresponding to the extension line in the drawing. For example, in FIG. 6A, the extension lines A11*a*, A11*b*, A12*a*, and A12*b* are shown in the drawing DI1 indicated by broken lines. In FIG. 6B, the extension lines A21*a*, A21*b*, A22*a*, and A22*b* are shown in the drawing DI2 indicated by broken lines. As described above, among these extension lines, the extension lines A12*a*, A12*b*, A22*a*, and A22*b* are lines corresponding to the reference portions of the housing, and the extension lines A11*a*, A11*b*, A21*a*, and A21*b* are lines corresponding to the edges of the labels. The positions in the captured image corresponding to these extension lines are identified by the pattern matching in S215. In a case where the target label is the label L1, the CPU 110 searches for a straight line edge parallel to the extension lines A12*a* and A12*b*, in the vicinity of the extension lines A12*a* and A12*b* in the captured image PI1 of FIG. 6A, and identifies the found edge as a reference portion. Thereby, the reference portions PS1*a* and PS1*b* corresponding to the extension lines A12*a* and A12*b* are identified in the captured image PI1. In a case where the target label is the label L2, the reference portions PS2*a* and PS2*b* corresponding to the extension lines A22*a* and A22*b* are identified in the captured image PI2 in FIG. 6B.

In S225, the CPU 110 identifies edges of the label in the captured image corresponding to extension lines in the drawing. For example, the CPU 110 identifies the edge of the end located near the extension line among the edges of the label identified in S210. In a case where the target label is the label L1, the right edge and the lower edge of the label PL1 corresponding to the extension lines A11*a* and A11*b* are identified in the captured image PI1. In a case where the target label is the label L2, the right edge and the upper edge of the label PL2 corresponding to the extension lines A21*a* and A21*b* are identified in the captured image PI2.

In S230, the CPU 110 calculates a dimension (distance) between the reference portion and the edge of the label in the captured image. For example, the CPU 110 counts the number of pixels between the reference portion and the edge of the label, and calculates the dimension (for example, in mm) based on the number of pixels. In this embodiment, internal parameters (for example, the focal length and optical center), external parameters (for example, the arrangement position of the camera), and the viewing angle of the capturing device 400 are known, and the positional relationship between the product 300 and the capturing device 400 is fixed. Thus, the relationship between the number of pixels and the dimension is defined as formulas. The CPU 110 converts the number of pixels into a dimension based on these formulas.

In a case where the target label is the label L1, the CPU 110 calculates the dimension d1*a* in the horizontal direction between the reference portion PS1*a* and the right edge of the label PL1, and the dimension dib in the vertical direction between the reference portion PS1*b* and the lower edge of the label PL1 in the captured image PI1. In a case where the target label is the label L2, the CPU 110 calculates the dimension d2*a* in the horizontal direction between the reference portion PS2*a* and the right edge of the label PL2, and the dimension d2*b* in the vertical direction between the reference portion PS2*b* and the upper edge of the label PL2 in the captured image PI2.

In S235, the CPU 110 determines whether the dimensions in the horizontal direction and the vertical direction between the label and the reference portion are within a dimension range. The dimension range is defined by the dimension information registered (stored) for each label in the inspection preparation process (FIG. 4) described above.

For example, in a case where the target label is the label L1, the registered dimension information in the horizontal direction is the design value "10" and the tolerance "±3", and the dimension information in the vertical direction is the design value "8" and the tolerance "±2". Thus, in a case where the dimension d1*a* in the horizontal direction satisfies $7<d1a<13$ and the dimension dib in the vertical direction satisfies $6<d1b<10$, it is determined that the dimensions in the horizontal direction and the vertical direction are within the dimension range. In a case where the dimension d1*a* in the horizontal direction does not satisfy $7<d1a<13$ or the dimension d1*b* in the vertical direction does not satisfy $6<d1b<10$, it is determined that the dimensions in the horizontal direction and the vertical direction are not within the dimension range.

In a case where the target label is the label L2, the registered dimension information in the horizontal direction is the design value "16" and the tolerance "±3", and the dimension information in the vertical direction is the design value "8" and the tolerance "±2". Thus, in a case where the dimension d2*a* in the horizontal direction satisfies $13<d2a<19$ and the dimension d2*b* in the vertical direction satisfies $6<d2b<10$, it is determined that the dimensions in the horizontal direction and the vertical direction are within the dimension range. In a case where the dimension d2*a* in the horizontal direction does not satisfy $13<d2a<19$ or the dimension d2*b* in the vertical direction does not satisfy $6<d2b<10$, it is determined that the dimensions in the horizontal direction and the vertical direction are not within the dimension range.

In a case where the dimensions in the horizontal direction and the vertical direction are within the dimension range (S235: YES), in S240, the CPU 110 determines that the affix position of the target label is the designed position. In a case where at least the dimension in the horizontal direction or the dimension in the vertical direction is not within the dimension range (S235: NO), in S245, the CPU 110 determines that the affix position of the target label is not the designed position.

In S250, the CPU 110 determines whether all labels have been processed as the target label. In a case where there is an unprocessed label (S250: NO), the CPU 110 returns to S200. In a case where all labels have been processed (S250: YES), in S255, the CPU 110 outputs a determination result. For example, the CPU 110 displays the determination result of each label on the display 140. Upon outputting the determination result, the inspection process ends.

According to this embodiment described above, regarding the product 300 in which the label L1 is affixed to the particular affix position (designed affix position in this embodiment), the CPU 110 acquires the drawing data DD1 indicating the drawing DI1 of the portion including at least the label L1 (S100 in FIG. 4, S212 in FIG. 5). The CPU 110 identifies the label BL1 in the drawing DI1 (S105 in FIG. 4) using the drawing data DD1. The CPU 110 identifies the positions of the reference portions BS1*a* and BS1*b* in the drawing DI1 by identifying the extension lines A12*a* and A12*b* in the drawing DI1 using the drawing data DD1 (S115 in FIG. 4). The CPU 110 acquires the dimension information shown in the drawing DI1 by using the drawing data DD1, the identification result of the label BL1 in the drawing DI1, and the identification result of the position of the reference portion in the drawing DI1 (in this embodiment, the identification result of the extension lines A12*a* and A12*b*) (S120 to S135 in FIG. 4). Further, the CPU 110 acquires captured image data by capturing an image of the product 300 to which the label L1 is affixed (S205 in FIG. 5). The CPU 110 identifies the label PL1 in the captured image PI1 by using the captured image data (S210 in FIG. 5). The CPU 110 identifies the reference portions PS1*a* and PS1*b* in the captured image PI1 by using the captured image data (S220 in FIG. 5). The CPU 110 determines whether the affix position of the label PL1 in the captured image PI1 is the particular affix position defined by the dimension information (designed affix position in this embodiment), by using the identification result of the label PL1 in the captured image PI1, the identification result of the reference portions PS1*a* and PS1*b* in the captured image PI1, and the dimension information (S225 to S245 in FIG. 5). As a result, the affix position of the label L1 affixed to the product 300 is easily inspected using the captured image data and using the drawing data DD1. For example, it is not necessary to create inspection logic for each label, and various labels are inspected simply by preparing drawing data for each label. In this embodiment, the drawing data DD1 indicating the drawing DI1 (FIG. 3A) used as the instructions for the affixing process of the label L1 is used. Thus, preparation of the drawing data is easy.

According to this embodiment, the dimension information includes the design values and tolerances of dimensions between the label L1 and the reference portions S1*a* and S1*b* (FIG. 3A). The CPU 110 identifies the dimensions between the label PL1 in the captured image PI1 and the reference portions PS1*a* and PS1*b* in the captured image PI1 (S225 and S230 in FIG. 5) and determines whether the identified dimensions are within the dimension range based on the design values and tolerances, thereby determining whether the affix position of the label PL1 in the captured image PI1 is the particular affix position (S235 to S245 in FIG. 5). As a result, the affix position of the label L1 is appropriately inspected based on the design values and tolerances.

According to this embodiment, the CPU 110 executes the distortion correction process for correcting distortion in the captured image PI1 on the captured image data (S208 in FIG. 5). The CPU 110 determines whether the affix position of the label PL1 in the captured image PI1 is the particular affix position by using the distortion-corrected captured image data (S210 to S245 in FIG. 5). In this way, by using the captured image data that has undergone the distortion correction process, it is accurately determined whether the affix position of the label L1 is the particular affix position. For example, even if capturing is performed in a state where the front surface 31 of the housing 30 is not perpendicular to the capturing direction AR1 of the capturing device 400, but is tilted, it is accurately determined whether the affix position of the label L1 is the particular affix position.

According to this embodiment, the labels to be inspected include the label L1 and the label L2, and the affix positions of the label L1 and the label L2 are specified on the basis of different reference portions (FIGS. 3A and 3B). The CPU 110 acquires the dimension information for each of the label L1 and the label L2 (S135, S145, and so on in FIG. 4). The CPU 110 executes S200 to S245 of the inspection process in FIG. 5 for each of the label L1 and the label L2. As a result, the affix positions of the plurality of labels L1 and L2 are appropriately inspected.

According to this embodiment, the label L1 is affixed to the front surface 31 of the housing 30 and the label L2 is affixed to the right side surface 32 of the housing 30 facing a different direction from the front surface 31. The drawing data used for the inspection preparation process and the inspection process includes the drawing data DD1 indicating the two-dimensional drawing DI1 of a portion of the front surface 31 including at least the label L1, and the drawing data DD2 indicating the two-dimensional drawing DI2 of a portion of the right side surface 32 including at least the label L2 (FIGS. 1, 3, and so on). The captured image data used for the inspection process includes the captured image data indicating the captured image PI1 of a portion of the front surface 31 including at least the label L1, and the captured image data indicating the captured image PI2 of a portion of the right side surface 32 including at least the label L2. As a result, the affix position of the label L1 and the affix position of the label L2 are appropriately inspected using different pairs of the drawing data and the captured image data. Further, a plurality of labels are easily inspected simply by preparing drawing data for each label.

Further, according to the above-described embodiment, in the inspection preparation process, the CPU 110 analyzes the drawing data DD1, which is bitmap data, to identify the extension lines A11*a* and A11*b* in contact with the label L1, and the extension lines A12*a* and A12*b* parallel to the extension lines A11*a* and A11*b* and away from the label L1 (FIG. 3A, S110 and S115 in FIG. 4). The CPU 110 identifies the numerical values N1*a* and N1*b* associated with these extension lines by analyzing the drawing data DD1 (S120 to S130 in FIG. 4), and acquires the dimension information based on the numerical values N1*a* and N1*b* (S135 in FIG. 4). As a result, even if the drawing data DD1 is bitmap data, the dimension information is appropriately acquired by analyzing the drawing data DD1 and identifying the numerical values N1*a* and N1*b* associated with the extension lines.

More specifically, the CPU 110 identifies the dimension lines E1*a* and E1*b* associated with these extension lines and the arrows R1*a* and R1*b* that are terminal symbols of the dimension lines E1*a* and E1*b* (S120 and S125 in FIG. 4). Then, the CPU 110 identifies the numerical values N1*a* and N1*b* by searching within the range based on the dimension lines E1*a* and E1*b* (S130 in FIG. 4). As a result, the dimension information is reliably acquired by appropriately analyzing the drawing data DD1. The drawing DI1 generally includes extension lines, dimension lines, and terminal symbols such as arrows according to the rules defined by standards such as JIS (Japanese Industrial Standards). For example, by analyzing the drawing data DD1 based on the rules, extension lines, dimension lines, and terminal symbols such as arrows are reliably identified and numerical values indicating dimensions are also reliably identified.

B. SECOND EMBODIMENT

Figure 7:
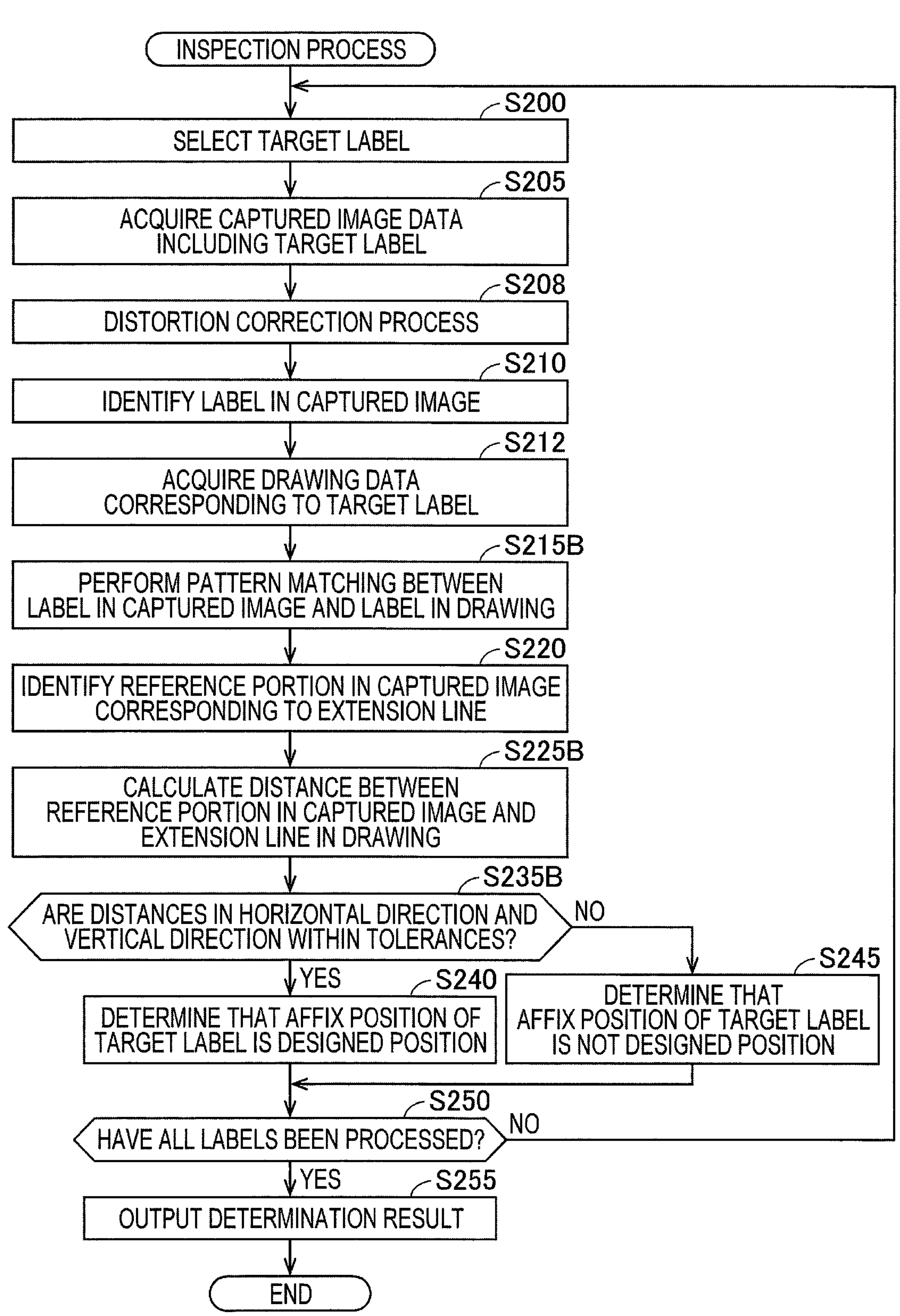
FIG. 7 is a flowchart of an inspection process.

A second embodiment differs from the first embodiment in the configuration of an inspection process. The other configurations of the second embodiment are the same as those of the first embodiment. FIG. 7 is a flowchart of an inspection process of the second embodiment.

In FIG. 7, the same steps as those in FIG. 5 are given the same reference signs as in FIG. 5, and the steps different from those in FIG. 5 are appended with "B" at the end of the reference signs. In the inspection process of FIG. 7, S215B is executed instead of S215 of FIG. 5, and S225B and S235B are executed instead of S225, S230 and S235 of FIG. 5. The other steps of the inspection process in FIG. 7 are the same as the steps in FIG. 5. In the following, portions of the inspection process in FIG. 7 that are different from those in FIG. 5 will be described, taking as an example the case where the target label is the label L1.

In S215B, the CPU 110 performs pattern matching between the label PL1 in the captured image PI1 and the label BL1 in the drawing DI1. Specifically, the CPU 110 performs a size change process on the drawing DI1 such that the size of the label BL1 in the drawing DI1 matches the size of the label PL1 in the captured image PI1. The size change process is processing for changing the size of an image, and is either an enlargement process or a reduction process. The CPU 110 determines the position and angle of the drawing DI1 with respect to the captured image PI1 such that the label BL1 in the resized drawing DI1 matches the label PL1 in the captured image PI1. In a modification, a size change process may be performed on the captured image PI1 in pattern matching.

Figure 8A:
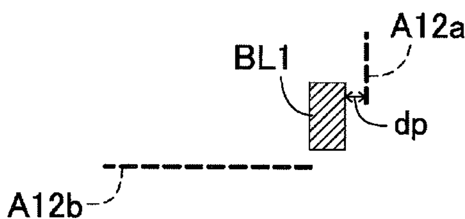
FIGS. 8A and 8B are explanatory diagrams for explaining an inspection process.
Figure 8B:
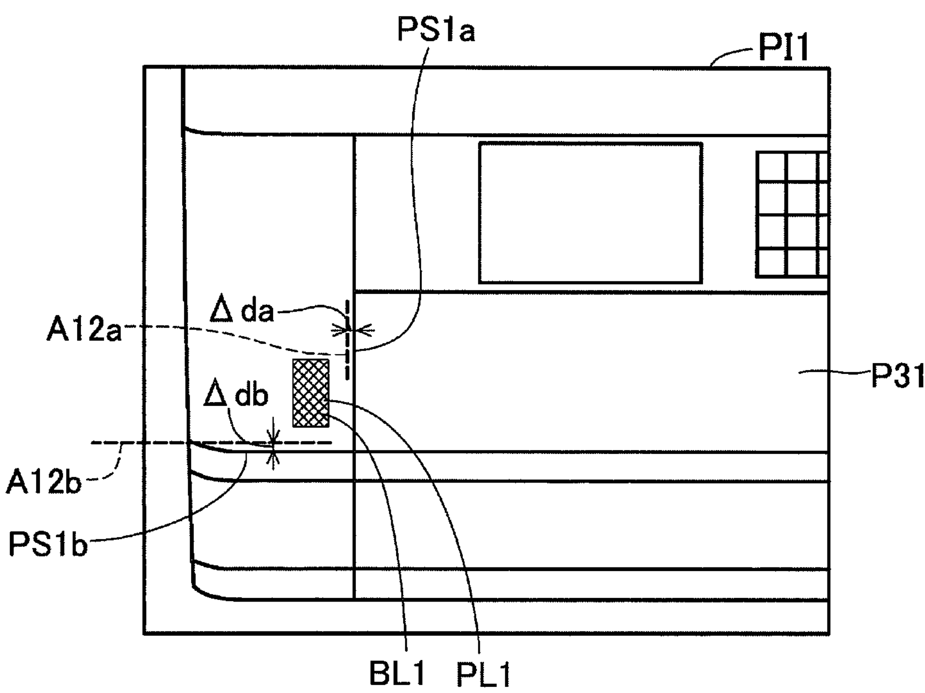

FIGS. 8A and 8B are explanatory diagrams of the inspection process of the second embodiment. FIG. 8A shows only the label BL1 and two extension lines A12*a* and A12*b* of the drawing DI1. FIG. 8B shows a state where the label BL1 and two extension lines A12*a* and A12*b* of FIG. 8A are arranged with respect to the captured image PI1 in the size and positional relationship determined by the pattern matching in S215B. In FIG. 8B, the label PL1 in the captured image PI1 completely overlaps the label BL1 in the drawing DI1.

In S220, similarly to S220 of FIG. 5, the CPU 110 identifies the reference portions PS1*a* and PS1*b* in the captured image corresponding to the extension lines A12*a* and A12*b*. In the state of FIG. 8B, in a case where the distance between the label BL1 and the reference portion PS1*a* is equal to the design value, the reference portion PS1*a* and the extension line A12*a* overlap (match). In a case where the distance between the label BL1 and the reference portion PS1*a* is not equal to the design value, the reference portion PS1*a* and the extension line A12*a* do not overlap. Similarly, there are a case where the reference portion PS1*b* and the extension line A12*b* overlap and a case where the reference portion PS1*b* and the extension line A12*b* do not overlap. In the example of FIG. 8B, the reference portion PS1*a* and the extension line A12*a* do not overlap, and the reference portion PS1*b* and the extension line A12*b* do not overlap.

In S225B, the CPU 110 calculates a distance Δda in the horizontal direction between the reference portion PS1*a* in the captured image PI1 and the extension line A12*a* in the drawing DI1 in the state of FIG. 8B. For example, the CPU 110 calculates a distance dp (FIG. 8A) between the label BL1 and the extension line A12*a* in units of pixels. The CPU 110 determines a coefficient to convert the number of pixels into millimeters (mm), based on the ratio between the distance dp in units of the number of pixels and the design value of the distance dp, that is, the design value (unit: mm) indicated by the numerical value N1*a* in FIG. 3A. Alternatively, the coefficient may be determined based on the ratio between the number of pixels of the width or height of the label BL1 and the pre-stored measured value (in mm) of the width or height of the label L1. The design value indicated by the numerical value N1*a* is included in the dimension information registered in the inspection preparation process. After calculating the distance Δda in units of the number of pixels, the CPU 110 converts the unit of the distance Δda into millimeters using the coefficient described above. By using a similar method, the CPU 110 calculates a distance Δdb in the vertical direction between the reference portion PS1*b* in the captured image PI1 and the extension line A12*b* in the drawing DI1 in the state of FIG. 8B.

In S235B, the CPU 110 determines whether the distance Δda in the horizontal direction and the distance Δdb in the vertical direction are within the tolerance. The tolerance is included in the dimension information registered in the inspection preparation process. In a case where the distance Δda in the horizontal direction and the distance Δdb in the vertical direction are within the tolerance (S235B: YES), in S240, the CPU 110 determines that the affix position of the target label (for example, the label L1) is the designed position. In a case where at least the distance Δda in the horizontal direction or the distance Δdb in the vertical direction is not within the tolerance (S235B: NO), in S245, the CPU 110 determines that the affix position of the target label (for example, the label L1) is not the designed position.

According to the second embodiment described above, in pattern matching, the size change process is executed such that the size of the label PL1 in the captured image PI1 matches the size of the label BL1 in the drawing DI1, and it is determined whether the affix position of the label PL1 in the captured image PI1 is the particular affix position by using the resized drawing data. It is considered that the size of the label hardly fluctuates due to manufacturing errors and so on. Further, since the shape of the label is a simple shape such as a rectangle, the size change process is performed easily and accurately. As a result, the distance Δda in the horizontal direction and the distance Δdb in the vertical direction are calculated with high accuracy, and thus it is determined with high accuracy whether the affix position of the label PL1 is the particular affix position.

According to the second embodiment, the CPU 110 identifies the differences (that is, distances Ada and Δdb) between the positions of the reference portions PS1*a* and PS1*b* in the captured image PI1 and the positions of the reference portions BS1*a* and BS1*b* in the drawing DI1 (S225B in FIG. 7) in a state where the position and size of the label PL1 in the captured image PI1 match the position and size of the label BL1 in the drawing DI1 (FIG. 8B). By determining whether these distances Ada and Δdb are within the tolerance, it is determined whether the affix position of the label PL1 in the captured image PI1 is the particular affix position. As a result, it is appropriately determined whether the label affix position is the particular affix position by a method different from the inspection process of the first embodiment.

C. MODIFICATIONS (1) In the inspection preparation process of FIG. 4 of the above embodiment, the dimension information is acquired by identifying the extension lines in S110 and S115 of FIG. 4 and identifying the numerical values associated with the extension lines in S120 to S130. However, the method of acquiring the dimension information is not limited to this.

For example, instead of identifying the extension lines A12*a* and A12*b* in S115 of FIG. 4, the CPU 110 may identify the positions of the reference portions BS1*a* and BS1*b* by identifying the reference portions BS1*a* and BS1*b* themselves in the drawing DI1 using a technique such as pattern matching. Then, the CPU 110 may acquire the dimension information by searching for numerical values in the vicinity of the label BL1 and the reference portions BS1*a* and BS1*b* in the drawing DI1.

(2) In the above embodiments, the drawing data DD1 is bitmap data. However, the drawing data may be CAD data including vector data indicating diagrams, extension lines, and so on, and numerical data indicating design values and tolerances. In this case, the CPU 110 may identify the extension line for defining the positional relationship between the label and the housing from the extension line data included in the drawing data, and may acquire numerical data indicating the design value and tolerances associated with the extension line.

(3) In the inspection process shown in FIG. 5 of the above embodiment, the distortion correction process (S208) is executed. However, for example, in a case where the distortion of the captured image PI1 is small to the extent that the distortion does not affect the inspection process, the distortion correction process may be omitted.

(4) In the above embodiments, two labels are inspected, but the number of labels to be inspected may be one or three or more. Further, in the above embodiment, one drawing data and one captured image data are used for one label. Alternatively, one drawing data may be used for a plurality of labels, or one captured image data may be used for a plurality of labels. For example, in a case where a plurality of labels are affixed to the front surface 31, one drawing data or one captured image data including the plurality of labels may be used.

(5) In the inspection preparation process of the above embodiments, arrows are identified as the terminal symbol of the dimension line (S120 in FIG. 4), and the dimension line associated with the arrows is identified (S125 in FIG. 4). Alternatively, terminal symbols other than arrows, such as black dots or slashes, may be identified. Alternatively, the dimension line may be identified by searching for a straight line in the vicinity of the extension line, without identifying the terminal symbol.

(6) In the above embodiment, the shapes of the labels L1 and L2 are rectangles. Alternatively, the shapes of the labels L1 and L2 may be polygons other than rectangles such as triangles and pentagons, or may be circles or ellipses.

(7) In the above embodiments, the label affix position with respect to the housing is specified by specifying the distance in the horizontal direction between the label and the reference portion and the distance in the vertical direction between the label and the reference portion. Alternatively, all or part of the distance between the label and the reference portion for specifying the label affix position with respect to the housing may include a distance in a diagonal direction that is parallel to neither the horizontal direction nor the vertical direction. Even in this case, it is determined whether the label is in the affix position by acquiring the dimension information of the distance in the diagonal direction and determining whether the distance in the diagonal direction in the captured image is within a dimension range determined by the dimension information.

(8) In the above embodiments, the inspection preparation process and the inspection process are executed by the inspection apparatus 100 shown in FIG. 1. Alternatively, the inspection preparation process and the inspection process may be performed by separate apparatuses. In this case, for example, the dimension information registered by the inspection preparation process is stored in a memory of the apparatus that executes the inspection process. Further, all or part of the inspection preparation process and the inspection process may be executed by a plurality of computers (for example, a so-called cloud server) that communicate with each other via a network.

(9) In the above embodiments, the affix positions of the labels L1 and L2 affixed to the product 300 are inspected. Not limited to this, a technique similar to that of the above embodiments is generally applicable when inspecting the arrangement position of a constituent part (component) that constitutes a part of an object. That is, in each of the embodiments described above, the product 300 to which the labels L1 and L2 are affixed (the entirety of the labels L1 and L2 and the product 300) is an example of the object, and the labels L1 and L2 are an example of the constituent part.

For example, the object is not limited to the product 300, but may be a part constituting the product 300, such as a print head used in a printer. The object may be a combination of some parts constituting the product 300, for example, a print head used in a printer and a carriage on which the print head is mounted. The object may also be an unfinished intermediate product that is manufactured during the process of manufacturing the product 300.

For example, the constituent part is not limited to a label affixed to an object, but may be a formed part formed on the object, specifically, a screw hole, or patterns and inscriptions expressed with unevenness (a brand logo of a company or a product). Further, the constituent part may be a painted part applied to the object.

In a case where any of the above exemplified object and constituent part are adopted, for example, in S100 of FIG. 4, in the object in a state where the constituent part is arranged at a particular arrangement position, the CPU 110 may acquire drawing data of a portion of the object including at least the constituent part. Then, in S105 of FIG. 4, the CPU 110 uses the acquired drawing data to identify the constituent part in the drawing. In S115 of FIG. 4, by using the drawing data, the CPU 110 identifies extension lines and so on in the drawing to identify the position of a reference portion in the drawing, that is, a portion serving as a reference for specifying a particular arrangement position of the constituent part with respect to the object. The CPU 110 acquires dimension information shown in the drawing by using the drawing data, the identification result of the constituent part in the drawing, and the identification result of the position of the reference portion in the drawing. In S205 of FIG. 5, the CPU 110 may acquire captured image data obtained by capturing an image of the object in a state where the constituent part is arranged. In S210 of FIG. 5, the CPU 110 uses the captured image data to identify the constituent part in the captured image, and in S220 of FIG. 5, the CPU 110 uses the captured image data to identify the reference portion in the captured image. In S225 to S245 of FIG. 5, the CPU 110 may determine whether the arrangement position of the constituent part in the captured image is the particular arrangement position specified by the dimension information, by using the identification result of the constituent part in the captured image, the identification result of the reference portion in the captured image, and the dimension information. As a result, by using the drawing data DD1, the arrangement position of the constituent part that constitutes a part of the object is easily inspected by using the captured image data.

(10) In each of the above embodiments, part of the configuration implemented by hardware may be replaced with software, or conversely, part or all of the configuration implemented by software may be replaced with hardware. For example, all or part of the inspection preparation process and inspection process may be executed by a hardware circuit such as an ASIC (Application Specific Integrated Circuit).

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided as appropriate.

What is claimed is:

1. An inspection apparatus comprising:

a controller; and a memory storing instructions, the instructions, when executed by the controller, causing the inspection apparatus to perform:

acquiring drawing data indicating a drawing of a portion including a label affixed to a particular affix position of a product;

identifying the label in the drawing based on the drawing data;

identifying a position of a reference portion of the product in the drawing based on the drawing data, the reference portion being a portion serving as a reference for specifying the particular affix position of the label with respect to the product, the identifying the position of the reference portion including:

identifying a first extension line in contact with the label in the drawing by analyzing the drawing data; and identifying a second extension line parallel to the first extension line and separated from the label in the drawing, the second extension line being located on the reference portion, thereby identifying the position of the reference portion of the product in the drawing;

acquiring dimension information indicated in the drawing based on the drawing data, an identification result of the label in the drawing, and an identification result of the position of the reference portion in the drawing, the dimension information being information for specifying a positional relationship between the reference portion and the particular affix position, the dimension information including a tolerance of the particular affix position, the acquiring the dimension information including:

identifying a numerical value associated with the first extension line and the second extension line by analyzing the drawing data; and acquiring the dimension information based on the numerical value;

acquiring captured image data obtained by capturing an image of the product to which the label is affixed, a captured image indicated by the captured image data including a portion of the product including the label;

identifying the label in the captured image based on the captured image data;

identifying the reference portion of the product in the captured image based on the captured image data; and determining whether an affix position of the label in the captured image is the particular affix position specified by the dimension information, based on an identification result of the label in the captured image, an identification result of a position of the reference portion in the captured image, and the dimension information.

2. The inspection apparatus according to claim 1, wherein the dimension information includes the tolerance and a design value of a dimension between the label and the reference portion; and wherein the controller is configured to:

identify a dimension between the label in the captured image and the reference portion in the captured image; and determine whether the identified dimension is within a range specified by the design value and the tolerance, thereby determining whether the affix position of the label in the captured image is the particular affix position.

3. The inspection apparatus according to claim 1, wherein the controller is configured to:

identify a difference between a position of the reference portion in the captured image and a position of the reference portion in the drawing, in a state where a position and a size of the label in the captured image matches a position and a size of the label in the drawing; and determine whether the difference between the position of the reference portion in the captured image and the position of the reference portion in the drawing is within the tolerance, thereby determining whether the affix position of the label in the captured image is the particular affix position.

4. The inspection apparatus according to claim 1, wherein the controller is configured to further perform a distortion correction process of, on the captured image data, correcting distortion in the captured image; and wherein the controller is configured to determine whether the affix position of the label in the captured image is the particular affix position based on the captured image data on which the distortion correction process has been performed.

5. The inspection apparatus according to claim 1, wherein the controller is configured to further perform a size change process of changing a size of an image of at least the captured image data or the drawing data such that a size of the label in the captured image matches a size of the label in the drawing; and wherein the controller is configured to determine whether the affix position of the label in the captured image is the particular affix position based on image data of the at least the captured image data or the drawing data on which the size change process has been performed.

6. The inspection apparatus according to claim 1, wherein the label includes a first label and a second label;

wherein the particular affix position includes a first affix position at which the first label should be affixed and a second affix position at which the second label should be affixed;

wherein the reference portion includes a first reference portion and a second reference portion, the first reference portion serving as a reference for specifying the first affix position with respect to the product, the second reference portion serving as a reference for specifying the second affix position with respect to the product;

wherein the dimension information includes first dimension information and second dimension information, the first dimension information specifying a positional relationship between the first reference portion and the first affix position, the second dimension information specifying a positional relationship between the second reference portion and the second affix position;

wherein the controller is configured to identify the first label and the second label in the drawing;

wherein the controller is configured to identify a position of the first reference portion and a position of the second reference portion in the drawing;

wherein the controller is configured to acquire the first dimension information and the second dimension information in the drawing;

wherein the controller is configured to identify the first label and the second label in the captured image;

wherein the controller is configured to identify the first reference portion and the second reference portion in the captured image; and wherein the controller is configured to determine whether an affix position of the first label in the captured image is the first affix position and to determine whether an affix position of the second label in the captured image is the second affix position.

7. The inspection apparatus according to claim 6, wherein the first label is affixed to a first surface of the product, and the second label is affixed to a second surface of the product, the second surface facing a different direction from the first surface;

wherein the drawing data includes first drawing data and second drawing data, the first drawing data indicating a two-dimensional drawing of a portion of the first surface including the first label, the second drawing data indicating a two-dimensional drawing of a portion of the second surface including the second label; and wherein the captured image data includes first captured image data and second captured image data, the first captured image data indicating a captured image of a portion of the first surface including the first label, the second captured image data indicating a captured image of a portion of the second surface including the second label.

8. The inspection apparatus according to claim 1, wherein the drawing data is bitmap data.

9. The inspection apparatus according to claim 1, wherein the controller is configured to:

identify at least a dimension line associated with the first extension line and the second extension line or a terminal symbol of the dimension line; and identify the numerical value by searching a range based on the at least the dimension line or the terminal symbol, thereby acquiring the dimension information.

10. A non-transitory computer-readable storage medium storing a set of program instructions for an inspection apparatus, the inspection apparatus comprising a controller and a memory, the set of program instructions, when executed by the controller, causing the inspection apparatus to perform:

acquiring drawing data indicating a drawing of a portion including a label affixed to a particular affix position of a product;

identifying the label in the drawing based on the drawing data;

identifying a position of a reference portion of the product in the drawing based on the drawing data, the reference portion being a portion serving as a reference for specifying the particular affix position of the label with respect to the product, the identifying the position of the reference portion including:

identifying a first extension line in contact with the label in the drawing by analyzing the drawing data; and identifying a second extension line parallel to the first extension line and separated from the label in the drawing, the second extension line being located on the reference portion, thereby identifying the position of the reference portion of the product in the drawing;

acquiring dimension information indicated in the drawing based on the drawing data, an identification result of the label in the drawing, and an identification result of the position of the reference portion in the drawing, the dimension information being information for specifying a positional relationship between the reference portion and the particular affix position, the dimension information including a tolerance of the particular affix position, the acquiring the dimension information including:

identifying a numerical value associated with the first extension line and the second extension line by analyzing the drawing data; and acquiring the dimension information based on the numerical value;

acquiring captured image data obtained by capturing an image of the product to which the label is affixed, a captured image indicated by the captured image data including a portion of the product including the label;

identifying the label in the captured image based on the captured image data;

identifying the reference portion of the product in the captured image based on the captured image data; and determining whether an affix position of the label in the captured image is the particular affix position specified by the dimension information, based on an identification result of the label in the captured image, an identification result of a position of the reference portion in the captured image, and the dimension information.

11. An inspection apparatus comprising:

a controller; and a memory storing instructions, the instructions, when executed by the controller, causing the inspection apparatus to perform:

acquiring drawing data indicating a drawing of a portion including a constituent part arranged at a particular arrangement position of an object;

identifying the constituent part in the drawing based on the drawing data;

identifying a position of a reference portion of the object in the drawing based on the drawing data, the reference portion being a portion serving as a reference for specifying the particular arrangement position of the constituent part with respect to the object, the identifying the position of the reference portion including:

identifying a first extension line in contact with the constituent part in the drawing by analyzing the drawing data; and identifying a second extension line parallel to the first extension line and separated from the constituent part in the drawing, the second extension line being located on the reference portion, thereby identifying the position of the reference portion of the object in the drawing;

acquiring dimension information indicated in the drawing based on the drawing data, an identification result of the constituent part in the drawing, and an identification result of the position of the reference portion in the drawing, the dimension information being information for specifying a positional relationship between the reference portion and the particular arrangement position, the dimension information including a tolerance of the particular arrangement position, the acquiring the dimension information including:

identifying a numerical value associated with the first extension line and the second extension line by analyzing the drawing data; and acquiring the dimension information based on the numerical value;

acquiring captured image data obtained by capturing an image of the object on which the constituent part is formed, a captured image indicated by the captured image data including a portion of the object including the constituent part;

identifying the constituent part in the captured image based on the captured image data;

identifying the reference portion of the object in the captured image based on the captured image data; and determining whether an arrangement position of the constituent part in the captured image is the particular arrangement position specified by the dimension information, based on an identification result of the constituent part in the captured image, an identification result of a position of the reference portion in the captured image, and the dimension information.

12. The inspection apparatus according to claim 11, wherein the dimension information includes the tolerance and a design value of a dimension between the constituent part and the reference portion; and wherein the controller is configured to:

identify a dimension between the constituent part in the captured image and the reference portion in the captured image; and determine whether the identified dimension is within a range specified by the design value and the tolerance, thereby determining whether the arrangement position of the constituent part in the captured image is the particular arrangement position.

13. The inspection apparatus according to claim 11, wherein the controller is configured to:

identify a difference between a position of the reference portion in the captured image and a position of the reference portion in the drawing, in a state where a position and a size of the constituent part in the captured image matches a position and a size of the constituent part in the drawing; and determine whether the difference between the position of the reference portion in the captured image and the position of the reference portion in the drawing is within the tolerance, thereby determining whether the arrangement position of the constituent part in the captured image is the particular arrangement position.

14. The inspection apparatus according to claim 11, wherein the controller is configured to further perform a distortion correction process of, on the captured image data, correcting distortion in the captured image; and wherein the controller is configured to determine whether the arrangement position of the constituent part in the captured image is the particular arrangement position based on the captured image data on which the distortion correction process has been performed.

15. The inspection apparatus according to claim 11, wherein the controller is configured to further perform a size change process of changing a size of an image of at least the captured image data or the drawing data such that a size of the constituent part in the captured image matches a size of the constituent part in the drawing; and wherein the controller is configured to determine whether the arrangement position of the constituent part in the captured image is the particular arrangement position based on image data of the at least the captured image data or the drawing data on which the size change process has been performed.

16. The inspection apparatus according to claim 11, wherein the constituent part includes a first constituent part and a second constituent part;

wherein the particular arrangement position includes a first arrangement position at which the first constituent part should be arranged and a second arrangement position at which the second constituent part should be arranged;

wherein the reference portion includes a first reference portion and a second reference portion, the first reference portion serving as a reference for specifying the first arrangement position with respect to the object, the second reference portion serving as a reference for specifying the second arrangement position with respect to the object;

wherein the dimension information includes first dimension information and second dimension information, the first dimension information specifying a positional relationship between the first reference portion and the first arrangement position, the second dimension information specifying a positional relationship between the second reference portion and the second arrangement position;

wherein the controller is configured to identify the first constituent part and the second constituent part in the drawing;

wherein the controller is configured to identify a position of the first reference portion and a position of the second reference portion in the drawing;

wherein the controller is configured to acquire the first dimension information and the second dimension information in the drawing;

wherein the controller is configured to identify the first constituent part and the second constituent part in the captured image;

wherein the controller is configured to identify the first reference portion and the second reference portion in the captured image; and wherein the controller is configured to determine whether an arrangement position of the first constituent part in the captured image is the first arrangement position and to determine whether an arrangement position of the second constituent part in the captured image is the second arrangement position.

17. The inspection apparatus according to claim 16, wherein the first constituent part is arranged at a first surface of the object, and the second constituent part is arranged at a second surface of the object, the second surface facing a different direction from the first surface;

wherein the drawing data includes first drawing data and second drawing data, the first drawing data indicating a two-dimensional drawing of a portion of the first surface including the first constituent part, the second drawing data indicating a two-dimensional drawing of a portion of the second surface including the second constituent part; and wherein the captured image data includes first captured image data and second captured image data, the first captured image data indicating a captured image of a portion of the first surface including the first constituent part, the second captured image data indicating a captured image of a portion of the second surface including the second constituent part.

18. The inspection apparatus according to claim 11, wherein the drawing data is bitmap data.

19. The inspection apparatus according to claim 11, wherein the controller is configured to:

identify at least a dimension line associated with the first extension line and the second extension line or a terminal symbol of the dimension line; and identify the numerical value by searching a range based on the at least the dimension line or the terminal symbol, thereby acquiring the dimension information.

* * * * *